United States Patent
Kleytman

(10) Patent No.: US 6,522,445 B1
(45) Date of Patent: Feb. 18, 2003

(54) FEEDBACK SENSOR FOR M.E.M.S. MIRRORS

(75) Inventor: Fred Kleytman, Middletown, NJ (US)

(73) Assignees: Lucent Technologies Inc., Murray Hill, NJ (US); Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/428,970

(22) Filed: Nov. 4, 1999

(51) Int. Cl.[7] .......................... G02B 26/08; G02B 7/182
(52) U.S. Cl. ...................... 359/224; 359/872; 248/476; 33/DIG. 13
(58) Field of Search ................ 33/1 N, 1 PT, 33/227, 228, 281, 282, 285, 286, 288, 293, 613, DIG. 13, DIG. 21; 359/224, 849, 872, 876, 290, 298; 73/800, 862, 624; 248/476, 478, 491; 324/501, 96, 727

(56) References Cited

U.S. PATENT DOCUMENTS

| | | | | |
|---|---|---|---|---|
| 2,350,073 A | * | 5/1944 | Simmons, Jr. | 33/DIG. 13 |
| 2,416,664 A | * | 2/1947 | Ruge | 33/DIG. 13 |
| 2,597,751 A | * | 5/1952 | Ruge | 33/DIG. 13 |
| 3,825,343 A | * | 7/1974 | Moore | 33/DIG. 13 |
| 3,842,509 A | * | 10/1974 | Wyman et al. | 33/DIG. 13 |
| 3,853,000 A | * | 12/1974 | Barnett et al. | 33/DIG. 13 |
| 3,876,301 A | * | 4/1975 | Kosugi et al. | 33/1 PT |
| 4,344,172 A | * | 8/1982 | Busse | 356/213 |
| 5,207,000 A | * | 5/1993 | Chang et al. | 33/1 N |
| 5,408,253 A | * | 4/1995 | Iddan | 359/224 |
| 5,535,043 A | * | 7/1996 | La Fiandra et al. | 359/224 |
| 5,580,675 A | * | 12/1996 | Rouhani | 429/90 |
| 5,990,473 A | * | 11/1999 | Dickey et al. | 250/221 |
| 6,108,118 A | * | 8/2000 | Minamoto | 359/224 |
| 6,126,311 A | * | 10/2000 | Schuh | 374/21 |
| 6,188,504 B1 | * | 2/2001 | Murakami et al. | 359/224 |
| 6,249,402 B1 | * | 6/2001 | Katayama | 360/234.7 |
| 6,275,326 B1 | * | 8/2001 | Bhalla et al. | 359/224 |

* cited by examiner

Primary Examiner—Diego Gutierrez
Assistant Examiner—Madeline Gonzalez
(74) Attorney, Agent, or Firm—Gregg Welte

(57) ABSTRACT

A support for a mirror which reflects a laser ray to a detector. The mirror is gimballed about two perpendicular axes. The mirror is supported solely by strain gauges. Rotation of the mirror about an axis causes one of the strain gauges to produce a signal indicative of the rotation. The signals are used as feedback signals to indicate position of the mirror, and thus position of the reflected ray.

7 Claims, 10 Drawing Sheets

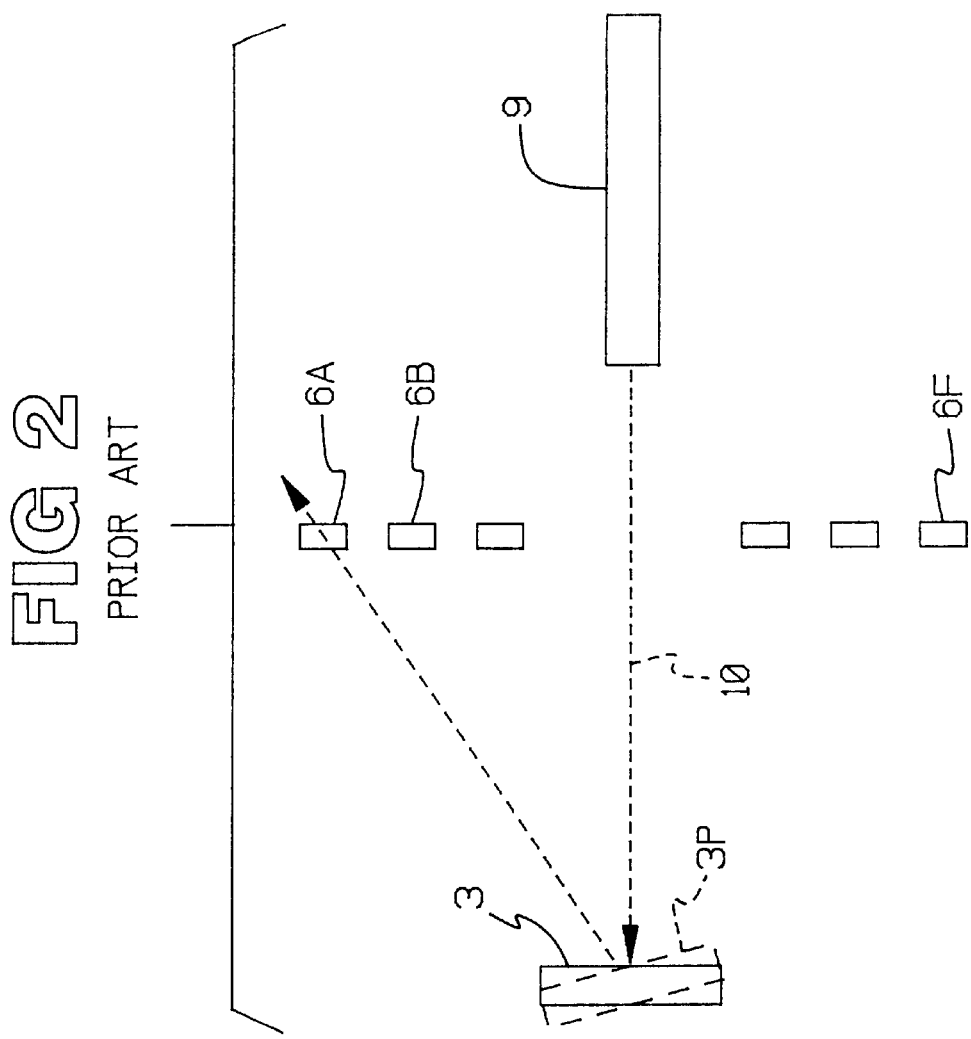
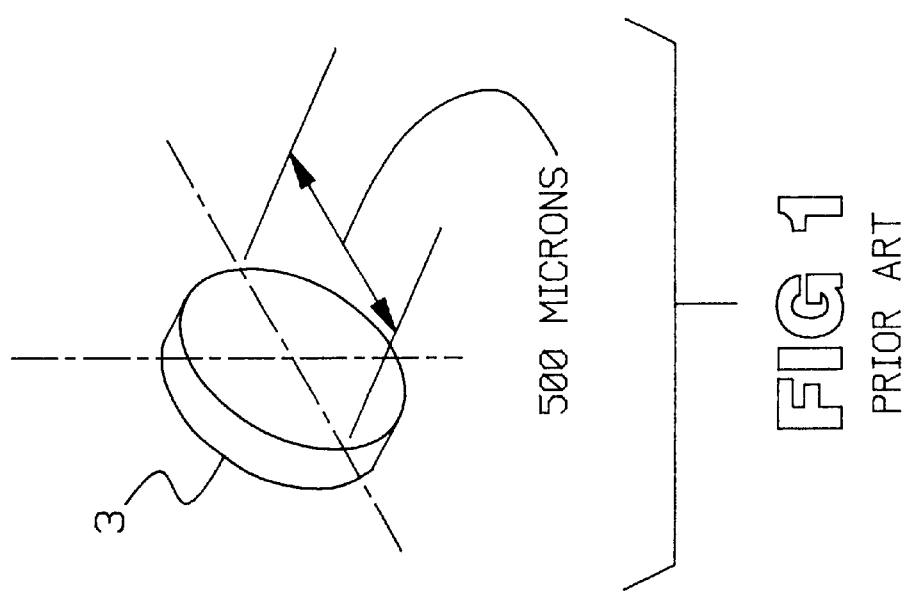

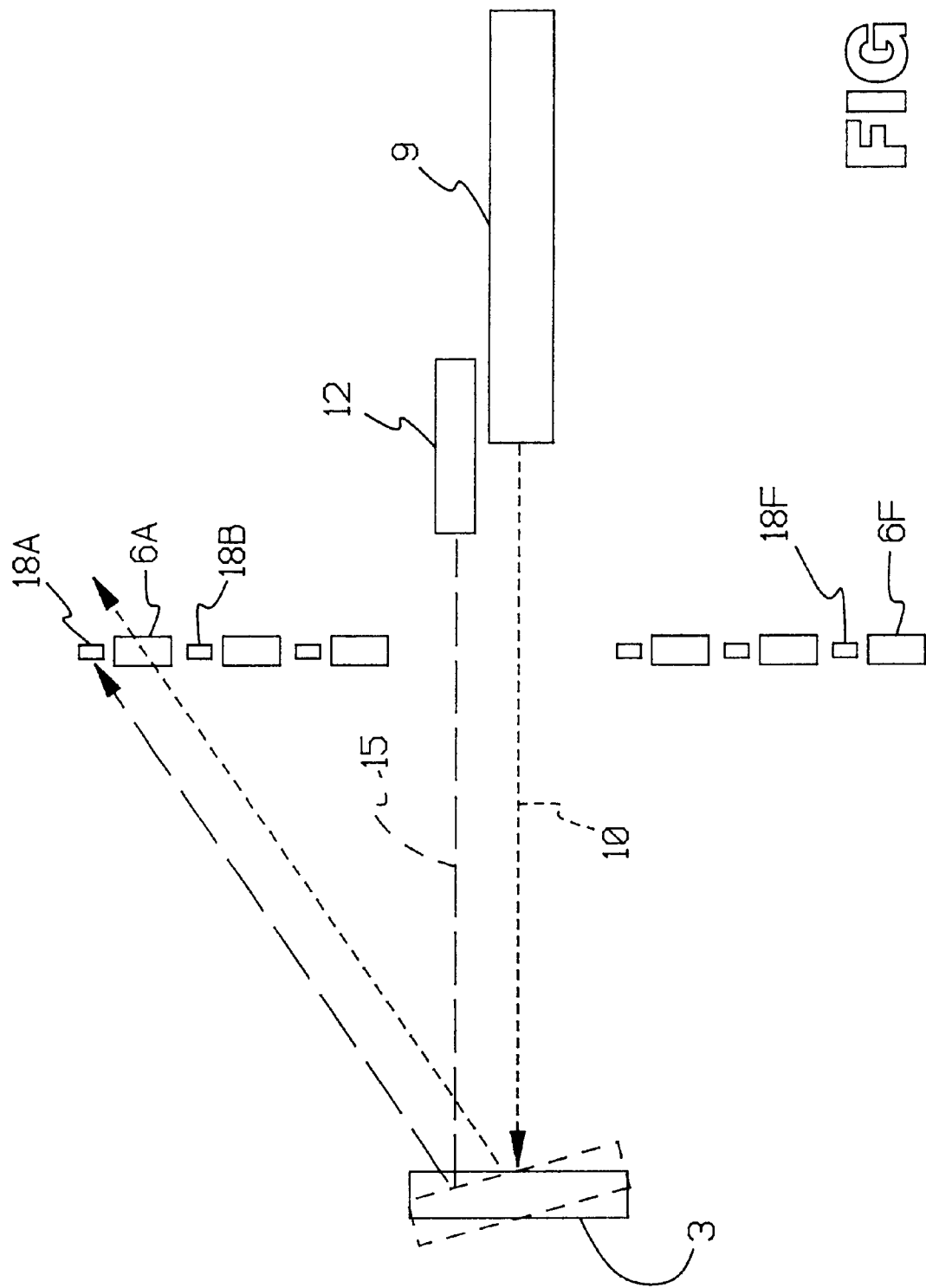

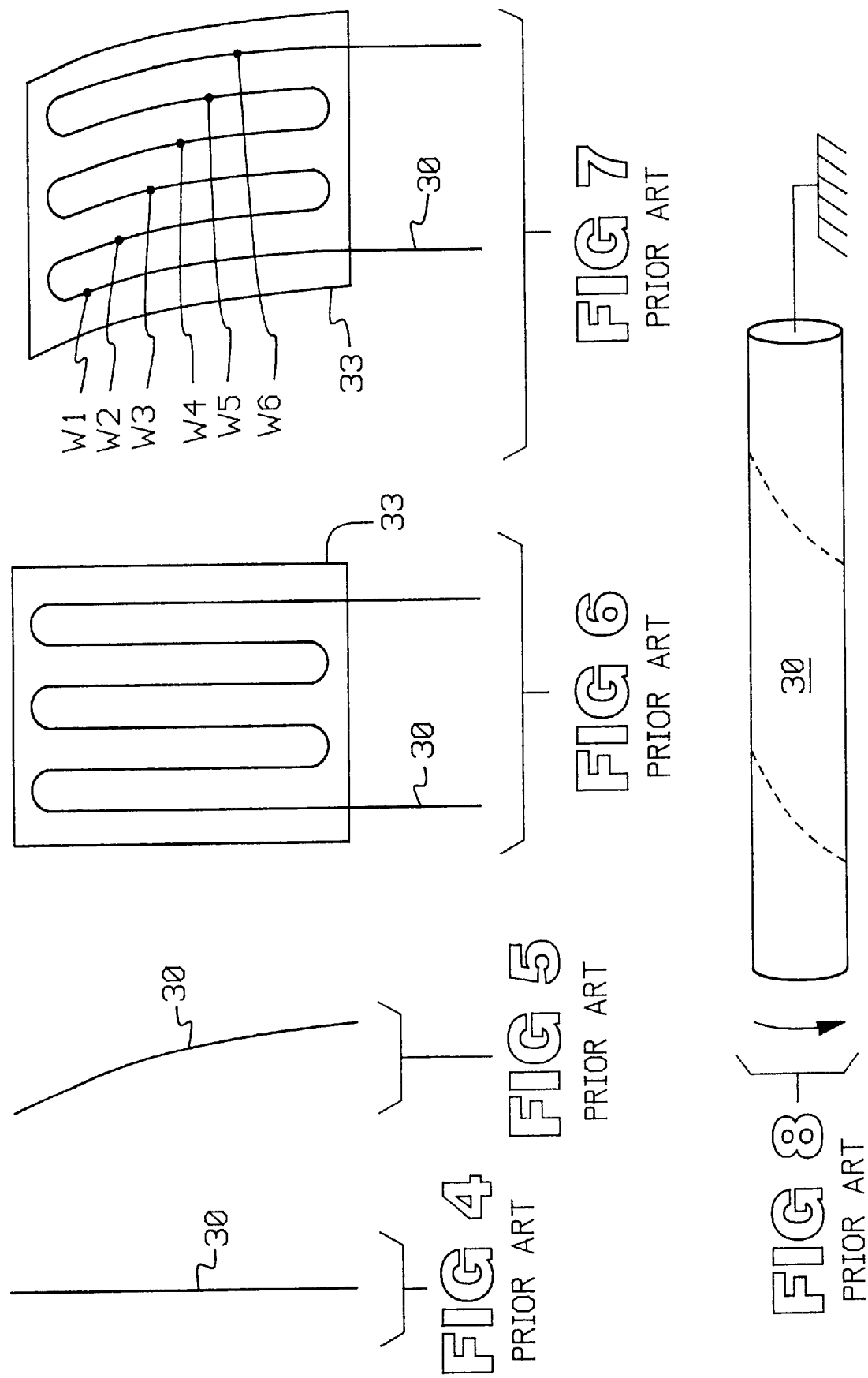

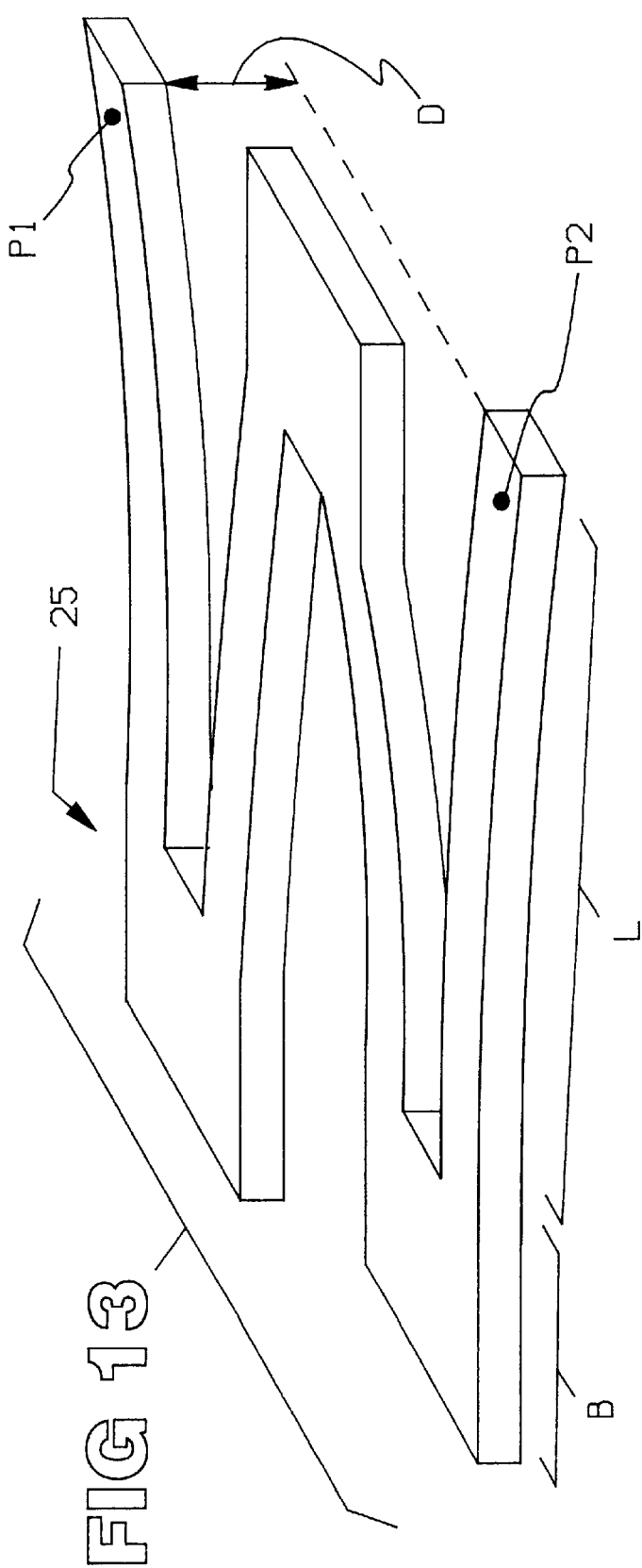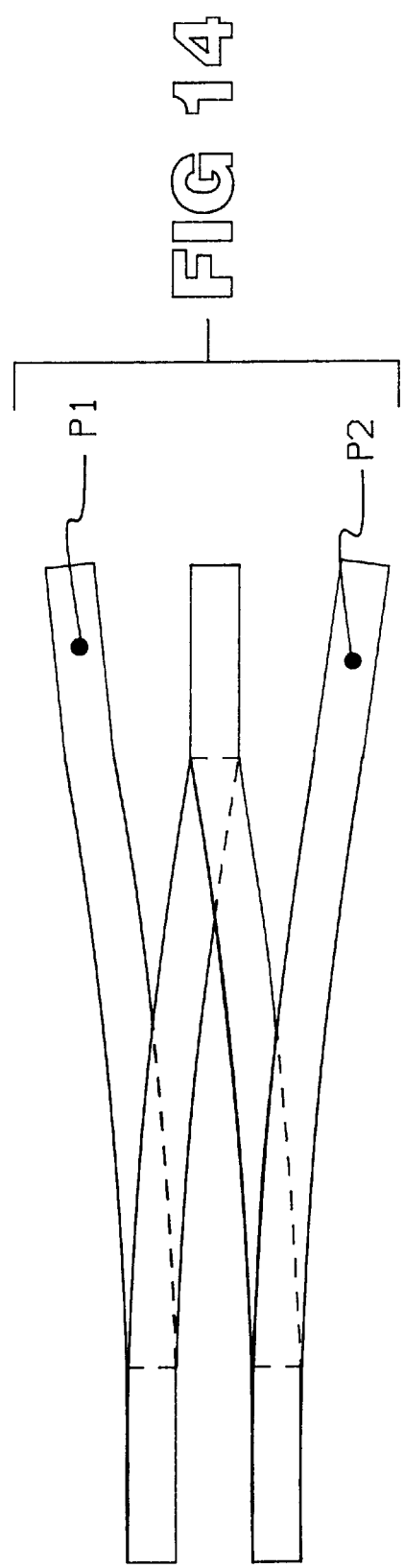

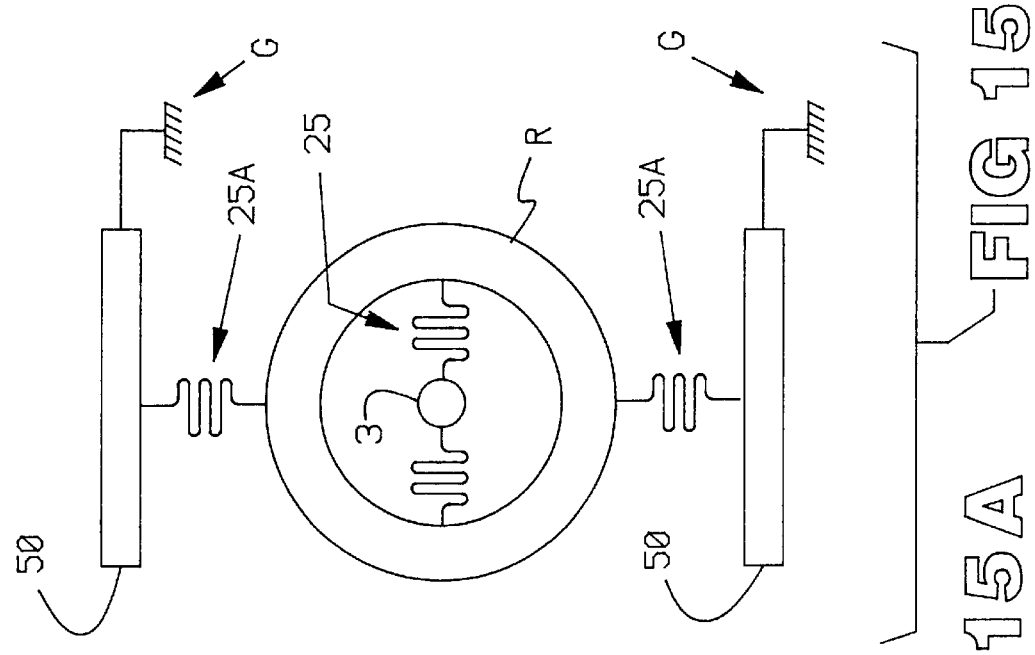
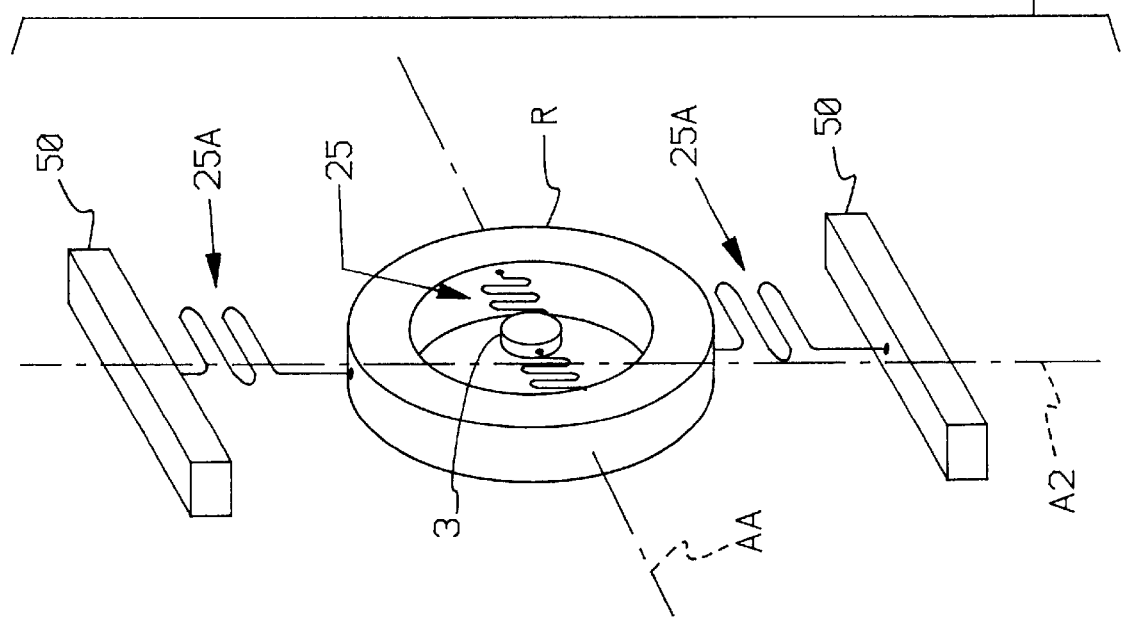

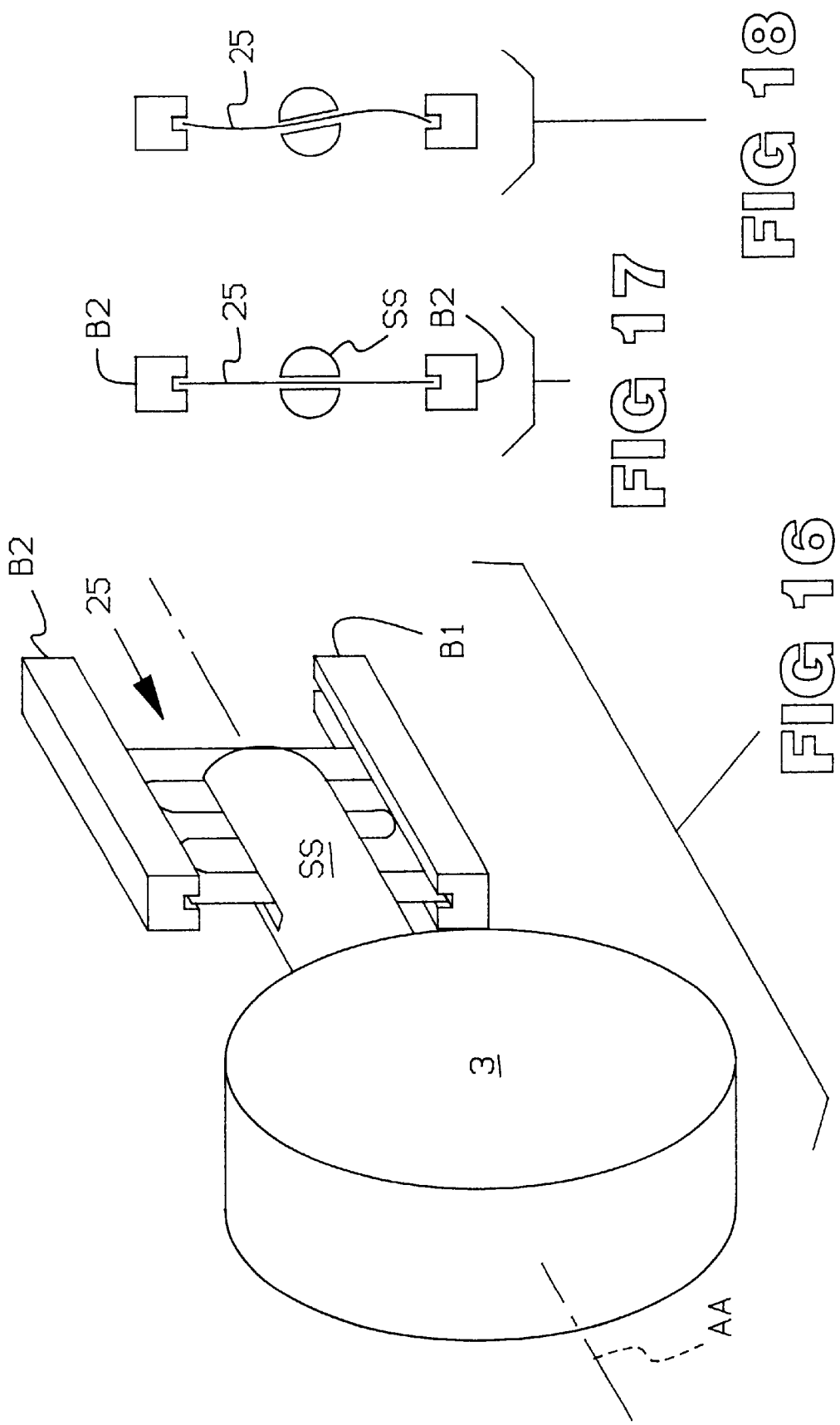

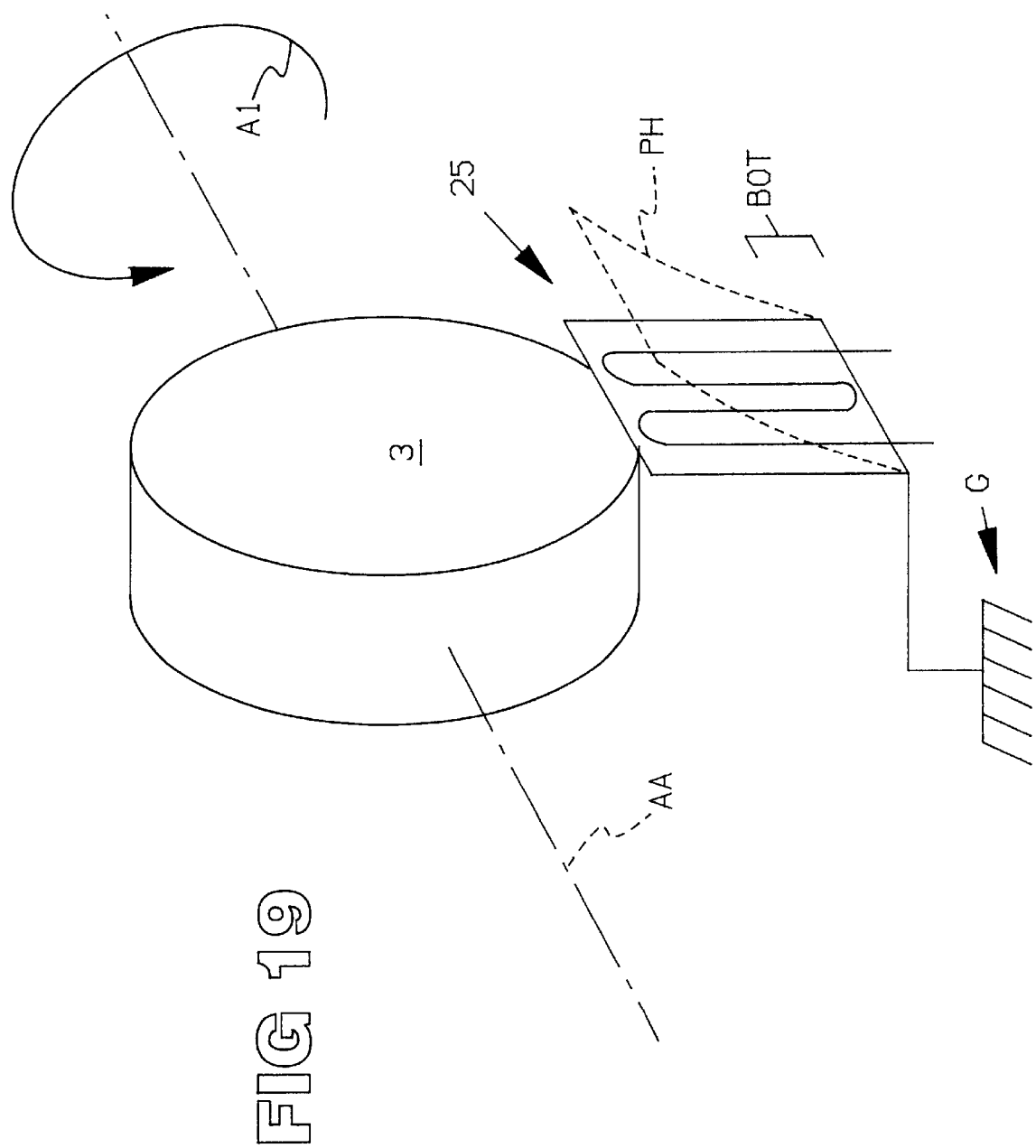

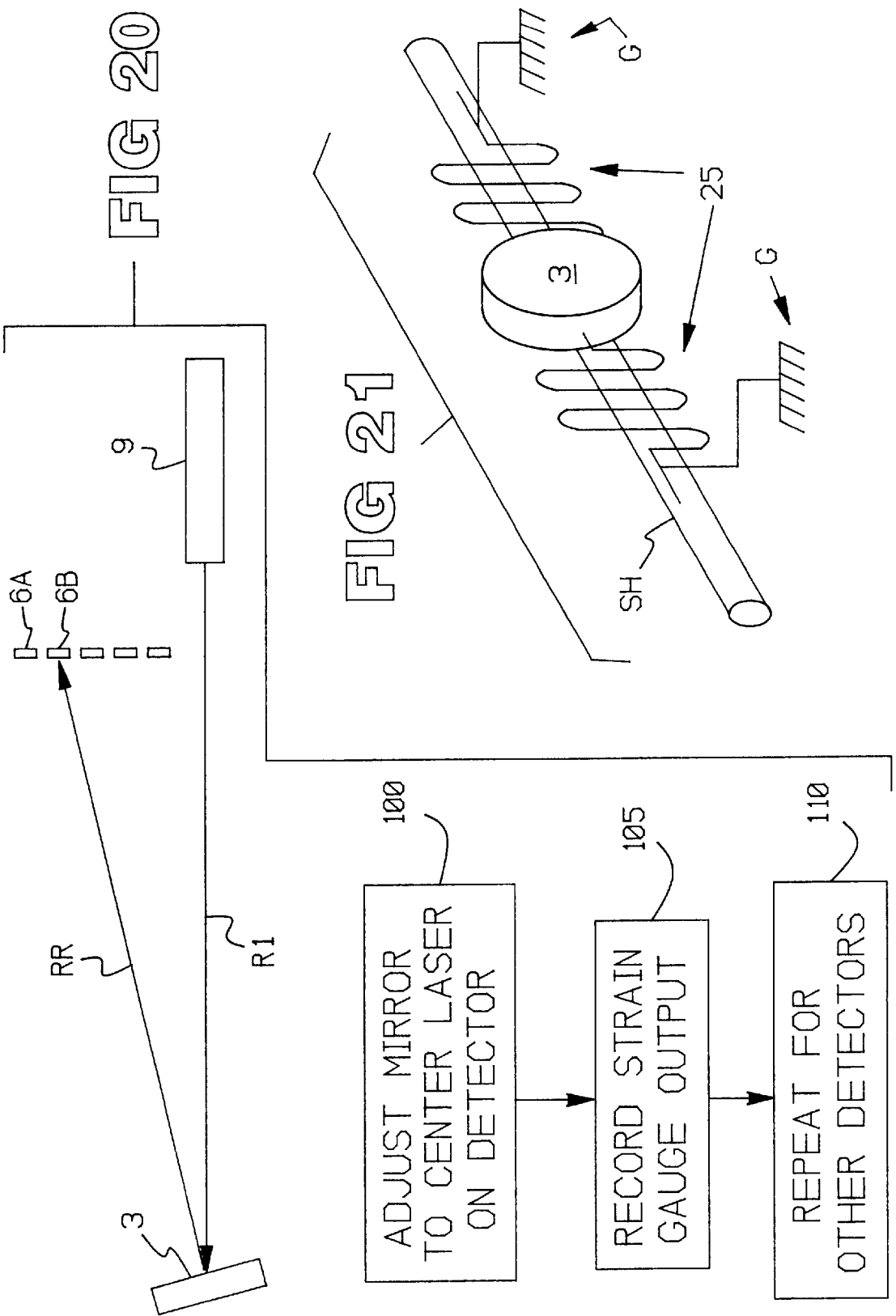

FEEDBACK SENSOR FOR M.E.M.S. MIRRORS

The invention concerns a position sensor which detects the position of a very small mirror, and provides a feedback signal indicative of the position.

BACKGROUND OF THE INVENTION

FIG. 1 illustrates a small mirror 3, of 500 microns diameter. Since 25.4 microns are contained in one mil, which is 1/1,000 inch, the diameter is equivalent to (500/25.4) mils, which equals about 20 mils. As two points of reference, (1) an ordinary sheet of typing paper is about four mils in thickness, and (2) the head of a straight pin, used by tailors, is about 80 mils in diameter.

The mirror is front-surface type, bearing a gold coating (not shown).

This type of mirror is used in Micro Electro Mechanical Switches, MEMS. FIG. 2 is a simplified schematic of part of an MEMS. Mirror 3 is shown, together with photodetectors 6, and a laser 9. The laser 9 projects an input signal 10 to the mirror 3. The mirror 3 is driven to a rotational position, indicated by phantom mirror 3P, by electric fields which are not shown, and reflects the laser signal to photodetector 6A, which delivers the signal to an output line, not shown.

In practice, feedback is provided, as shown in FIG. 3, to assure that the laser signal reaches the intended photodetector. For example, a second laser 12 projects a second laser beam 15, of different frequency, which is also reflected by mirror 3. A positioning detector 18 is associated with each photodetector 9. Receipt of the second laser beam 15 by the appropriate positioning detector confirms that the intended photodetector receives the laser signal.

FIGS. 2 and 3 are simplifications. Actual MEMS contain two-dimensional arrays of photodetectors, and the arrays can contain 256, or more, photodetectors. This type of MEMS is known in the art, and is described, for example, in the publication R & D, July, 1999, page 35.

One disadvantage of this type of MEMS is that the feedback system of FIG. 3 is complex and expensive.

SUMMARY OF THE INVENTION

In one form of the invention, strain gauges are used to support the mirror. The rotational position of the mirror changes the electrical resistance of the strain gauges, thereby producing a feedback signal indicative of mirror position.

BRIEF DESCRIPTION OF THE DRAWINGS

FIG. 1 illustrates a small mirror 3.

FIG. 2 illustrates a simplified schematic of a Micro Electro Mechanical Switch, MEMS.

FIG. 3 illustrates the apparatus of FIG. 2, together with a simplified representation of a position-detection apparatus, which indicates which detector 6 will receive ray 10, after reflection by mirror 3.

FIG. 4 illustrates a single-wire strain gauge, such as a wire constructed of the alloy constantan.

FIG. 5 illustrates the wire of FIG. 4, but bent in shape.

FIG. 6 illustrates a simple strain gauge.

FIG. 7 illustrates the strain gauge of FIG. 6, but bent in shape.

FIG. 8 illustrates the wire of FIG. 4, but under applied torsion.

FIGS. 13 and 14 illustrate generally how the strain gauge 25 of FIGS. 11 and 12 deforms when (1) it is used to support the mirror in FIGS. 9 and 10 and (2) the mirror is rotated away from its rest position.

FIGS. 15 and 15A illustrate a second form of the invention.

FIGS. 16, 17, and 18 illustrate another form of the invention.

FIG. 19 illustrates yet another form of the invention.

FIG. 20 illustrates a calibration procedure.

FIG. 21 illustrates another form of the invention.

DETAILED DESCRIPTION OF THE INVENTION

Overview

Figure 10:
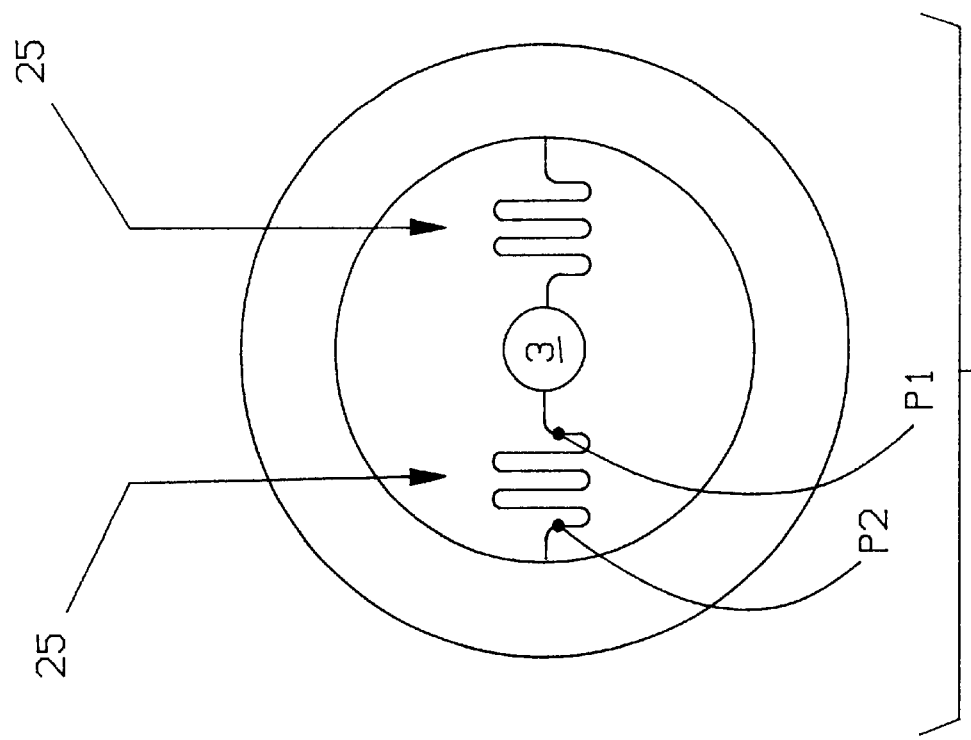
FIGS. 9 and 10 illustrate one form of the invention.

As shown in FIG. 10, strain gauges 25 support the mirror 3. When the mirror rotates in the direction of arrow A1 in FIG. 9, the strain gauges become deformed. The deformation changes the resistance of the strain gauges 25, thereby producing a feedback signal indicative of the amount of rotation of the mirror 3. Before describing these Figures in greater detail, a brief background regarding strain gauges will be given.

Strain Gauges Generally

FIG. 4 illustrates a single-wire strain gauge 30, such as a wire constructed of the alloy constantan. When such a wire is bent, as in FIG. 5, its electrical resistance changes. However, the change in resistance is very small. In order to facilitate detection of the change, the wire is arranged into a serpentine shape, as shown in FIG. 6, and bonded to a paper, or fabric backing 33. When the assembly is bent, as in FIG. 7, multiple wires W1–W6 become bent. Each changes in resistance. The collective change in resistance is easier to detect than the single change of the wire of FIG. 4.

As a hypothetical example, assume that the wire in FIG. 4 has a resistance of 1.0 ohm, and the same wire, when bent as in FIG. 5, has a resistance of 1.001 ohm. The change in resistance of 0.1 percent.

Assume that the serpentine wire of FIG. 7 contains 100 sections (only six sections are shown, W1–W6). The total resistance is 100.000 ohms, in the undeformed state. When deformed, the percentage change is the same as stated above, namely, 0.1 percent. However, the absolute change in resistance is 0.1 ohm, as opposed to 0.001 ohm in the single-wire case.

It is significantly easier to detect the larger absolute change of 0.1 ohm, compared with 0.001 ohm, which explains why the serpentine configuration of FIG. 6 is preferred. A bridge measurement, as by using a Wheatstone bridge, is used to detect the change.

Figure 9:
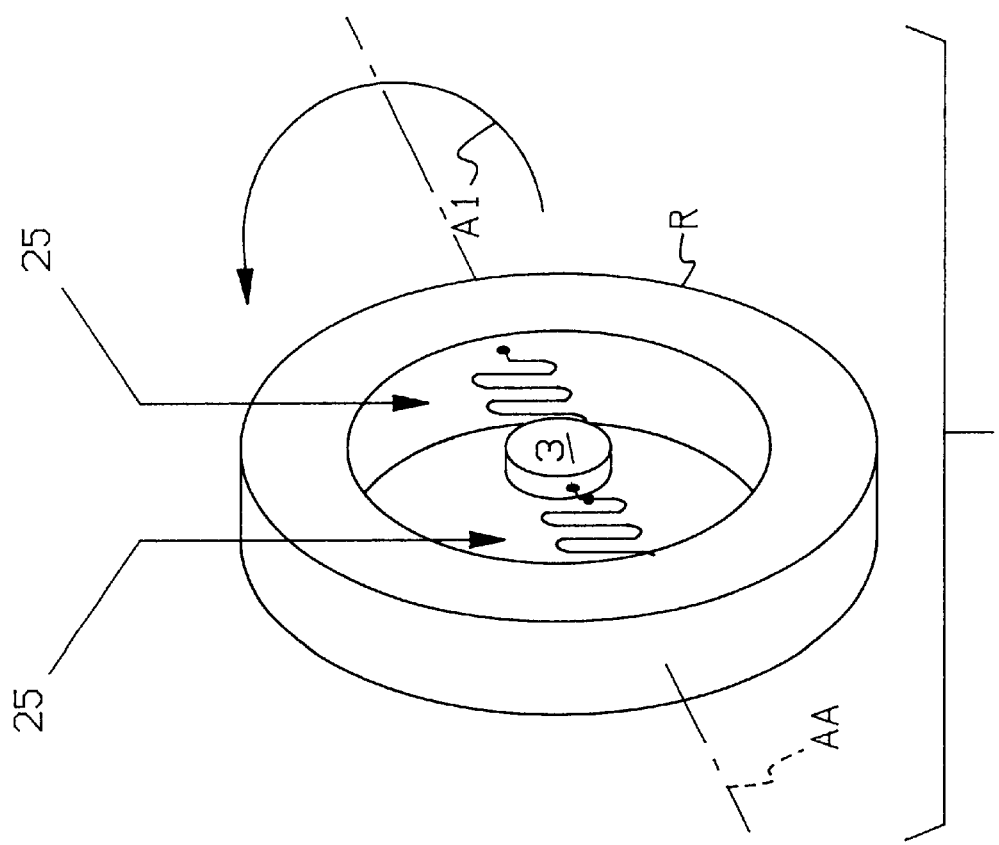

FIGS. 9 and 10

As shown in FIGS. 9 and 10, the strain gauges 25 support the mirror 3. The paper or fabric backing 33 shown in FIG. 6 is preferably absent. A generalized explanation of how the strain gauges 25 deforms when the mirror 3 rotates about axis AA in FIG. 9 will be given.

Figure 11:
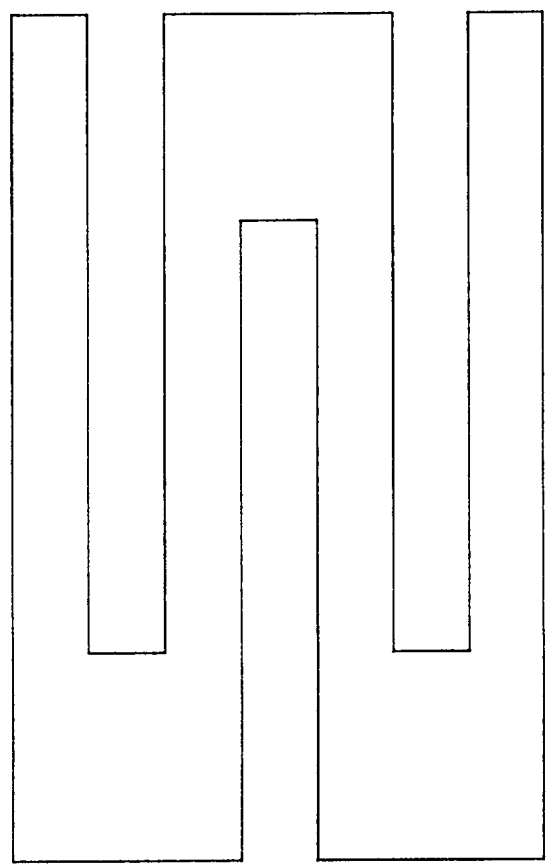
FIGS. 11 and 12 illustrate schematics of the strain gauge 25 of FIG. 9.
Figure 12:
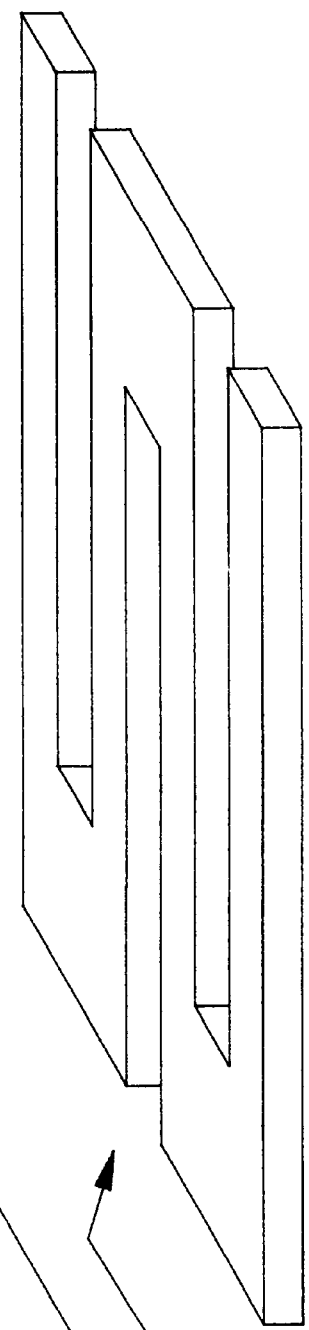

FIG. 11 illustrates a top view of the strain gauge 25. FIG. 12 illustrates a perspective view. Assume that the mirror 3 rotates in the direction A1 in FIG. 9, about axis AA. Points P1 and P2 on the strain gauge 25 in FIG. 10 will become displaced, as shown by distance D in FIG. 13, and in side view in FIG. 14.

Each leg L in FIG. 13 of the strain gauge will bend. Further, if base regions B are provided with sufficient modulus of elasticity, as by being made sufficiently long, thick, or both, they will experience minimal bending, and essentially all bending will occur within the legs L. The overall bending behavior is similar to that experienced by the bent strain gauge in FIG. 7.

Additional Embodiments

Second Axis

The preceding discussion presumed rotation about a single axis, namely, axis AA in FIG. 9. In another embodiment, the mirror 3 is gimballed about two axes AA and A2 in FIG. 15A. That is, ring R supports mirror 3 by strain gauges 25. Ring R is, in turn, supported by strain gauges 25A, which are supported by supports 50, which are stationary, as indicated by the ground symbols G in FIG. 15.

Since strain gauges 25A support a larger mass than strain gauges 25, the former gauges 25A are preferably designed to possess a spring constant which is proportional to the mass supported. That is, ignoring the masses of the strain gauges themselves, strain gauges 25 support the mass of the mirror M3. The other strain gauges 25A support the masses of the mirror M3 plus the mass of the ring MR. The spring constants should be in the ratio M3/(M3+MR), with strain gauges 25 having the smaller spring constant.

This ratio will tend to equalize the time constants, or frequency responses, of the two sprung masses, namely (M3) and (M3+MR).

Alternate Support Approaches

FIG. 16 shows the mirror 3, attached to a slotted shaft SS. The strain gauge 25 is supported by two stationary brackets B1 and B2, and is held within the slot. FIG. 17 provides a cross-sectional view. When the mirror 3 rotates about axis AA in FIG. 16, the strain gauge is forced to assume an S-shape, as in FIG. 18. This should double the bending of the strain gauge 25, producing twice the change in resistance for a given angular rotation of the mirror 3.

FIG. 19 shows a strain gauge 25 utilized as a leaf spring. The bottom BOT of the strain gauge 25 is held fixed, as indicated by ground symbol G. When the mirror 3 rotates in the direction of arrow A1, the strain gauge deforms into the phantom position PH, shown in greatly exaggerated form.

FIG. 8 illustrates a single-wire strain gauge 30, which is held under torsion. The surface stretches, as indicated by the dashed line. This stretching will change the resistance. If the wire 30 is positioned co-axial with axis AA in FIG. 19, as by drilling a hole through the mirror and fastening the mirror to the wire 30, the wire 30 will act both as strain gauge and spring, in the manner of a taut-band movement used in precision voltmeters.

FIG. 20 illustrates a calibration procedure. Laser 9 shines a ray R1 onto mirror 3. Mirror 3 is rotated, using an MEMS system, not shown, until the reflected ray RR becomes centered on detector 6B, or otherwise causes detector 6B to produce a maximal signal. At this time, the outputs of the strain gauges in FIG. 15A are recorded. The process is repeated for other detectors.

Blocks 100–110 indicate a flow chart describing the procedure. In block 100, the mirror 3 is adjusted to cause a selected detector to provide a maximal output. In block 105, the outputs of the strain gauges are recorded. In block 110, the preceding two steps are repeated for the remainder of the detectors 6.

The recorded data provides a table by which later-measured strain gauge data will indicate which detector 6 ray RR impinges upon. That is, when the MEMS system moves the mirror 3 in FIG. 2, it utilizes feedback from the invention to ascertain mirror position.

Additional Considerations

1. The preceding discussion presumed that rotation about axis AA in FIG. 15A is detected by strain gauges 25, which deform generally in the manner shown in FIGS. 13 and 14. However, it is possible to detect rotation about the other axis A2 using those same strain gauges. Those strain gauges 25 will become elongated, accordion-style, as rotation occurs. In this case, rotation about axis AA would similarly be detected by elongation of strain gauges 25A.

Stated in other words, strain gauges 25 now measure rotation about axis A2, while strain gauges 25A now measure rotation about axis AA.

In determining which strain gauges to associate with an axis, a simple test is performed: rotate about one axis, and measure which set of strain gauges produces the larger response.

2. In one form of the invention, the sole support of the mirror 3 lies in the strain gauges 25 and 25A in FIG. 15. It may be thought that a linkage exists between a motive device and the mirror, which moves the mirror, and that the linkage provides support. However, in one type of MEMS, such a linkage does not exist. In that type of MEMS, electrostatic charge moves the mirror.

3. The strain gauges 25 in FIG. 15 may be connected electrically in series, as may be strain gauges 25A.

4. The discussion above was based on the premise that the sole support of the mirror 3 is the strain gauges 25 and 25A. However, another structure can be used to support the mirror 3, while the strain guages measure angular displacement of the mirror.

FIG. 21 illustrates such a situation. Shaft SH supports the mirror 3, while strain gauges 25 measure angular displacement. The ends of the strain gauges 25 are structurally grounded, as indicated by the ground symbols G. Strain gauges 25 are not connected to the shaft SH, except perhaps insofar as the mirror 3 is connected to the shaft SH.

Numerous substitutions and modifications can be undertaken without departing from the true spirit and scope of the invention. What is desired to be secured by letters patent is the invention as defined in the following claims.

What is claimed is:

1. A system comprising:
   a) a movable mirror which reflects a laser ray to a detector within an array of detectors; and
   b) strain gauge means, linked to the mirror, which produce resistance changes which indicate mirror position, wherein
      i) the mirror is supported from a movable support (R) by a first strain gauge means; and
      ii) the movable support (R) is supported from a stationary support by a second strain gauge means.

2. The system according to claim 1, wherein the first strain gauge means allows the mirror to rotate about a first axis.

3. The system according to claim 2, wherein the second strain gauge means allows the mirror to rotate about a second axis.

4. The system according to claim 3, wherein the first and second axes are mutually perpendicular.

5. The system according to claim 3, wherein the second strain gauge means has a spring constant greater than a spring constant of the first strain gauge means.

6. An apparatus, comprising:
   a) a stationary base;
   b) a movable support, suspended from the base by a first strain gauge means, which produces a first resistance signal which changes as the movable support rotates about a first axis;
   c) a mirror, suspended from the movable support by a second strain gauge means, which produces a second resistance signal which changes as the mirror rotates about a second axis.

7. The apparatus according to claim 6, wherein no support other than the first strain gauge means suspends the movable support from the base.

* * * * *